INVENTORS
Walter P. Baermann
Vincent M. Foote
By Wolf, Hubbard, Voit & Osann
ATTORNEYS

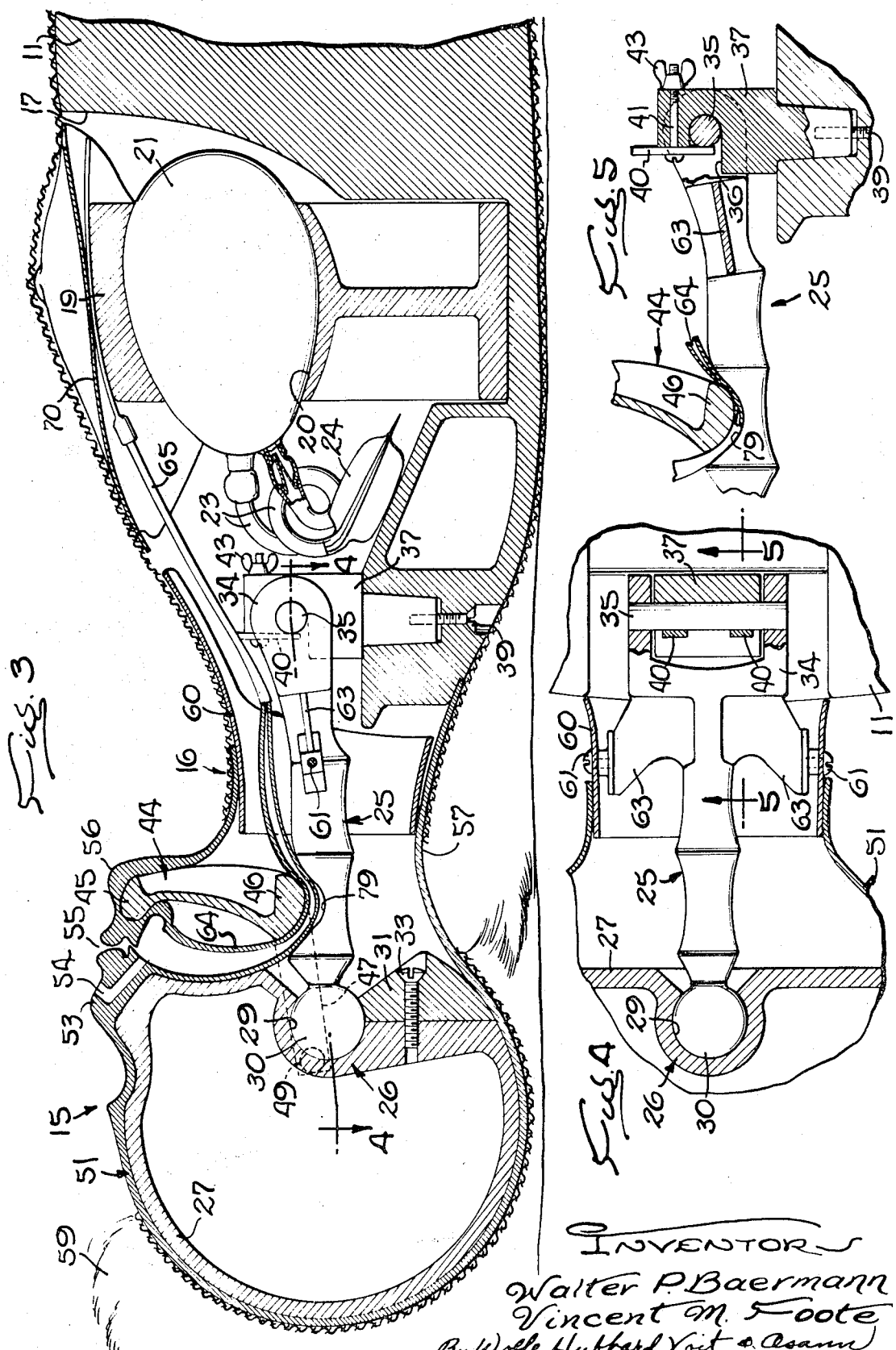

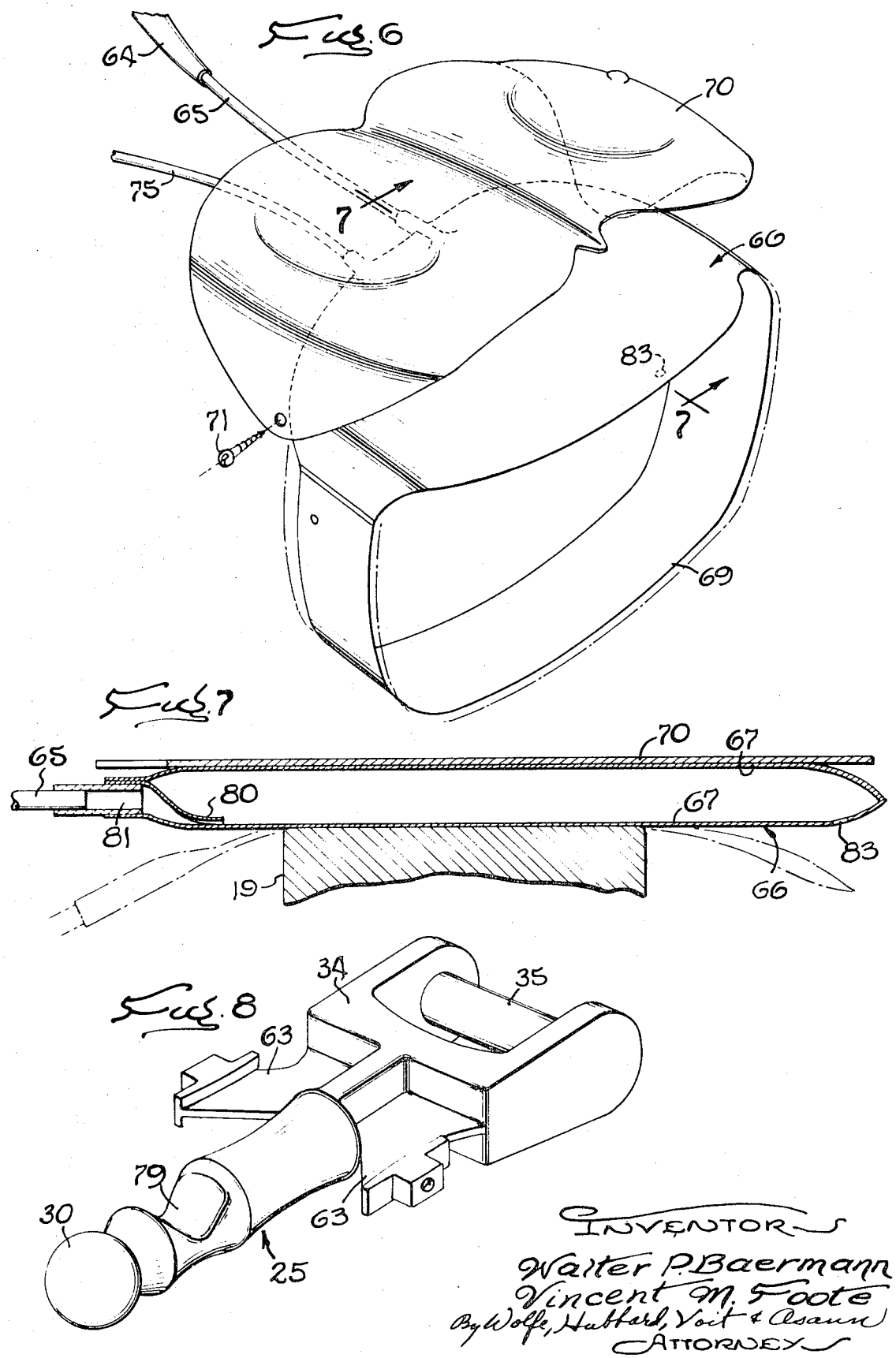

United States Patent Office 3,562,924
Patented Feb. 16, 1971

3,562,924
TRAINING MANIKIN FOR TEACHING AND PRACTICING MOUTH-TO-MOUTH RESUSCITATION
Walter P. Baermann and Vincent M. Foote, Raleigh, N.C., assignors to Medical Supply Company, Rockford, Ill., a corporation of Missouri
Filed Mar. 3, 1969, Ser. No. 803,806
Int. Cl. G09b 23/28
U.S. Cl. 35—17                                   12 Claims

ABSTRACT OF THE DISCLOSURE

The manikin comprises a life-like human head joined to the neck of a simulated human torso for realistic universal turning and tilting by a ball-and-socket connection, the head including a mouth which is connected by an air passage to a bag simulating a lung and adapted to be inflated when a trainee breathes into the mouth of the manikin. When the head is tilted forwardly, the air passage is pinched off and obstructed to prevent inflation of the bag such that the manikin simulates a human victim with a blocked windpipe. By lifting the neck and tilting the head rearwardly, the passage may be opened to permit inflation of the bag.

BACKGROUND OF THE INVENTION

This invention relates to a training manikin for use in teaching and practicing the principles of mouth-to-mouth resuscitation. More particularly, the invention relates to a training manikin of the type which includes a simulated torso, a simulated head with a mouth, and a simulated lung which is connected to the mouth by an air passage so that a trainee may practice mouth-to-mouth resuscitation by breathing into the mouth of the manikin to inflate the lung. To simulate an unconscious human with a blocked windpipe, the manikin is arranged such that the air passage is pinched off to prevent inflation of the lung unless the trainee keeps the head tilted and extended rearwardly while applying mouth-to-mouth resuscitation. One type of generally similar training device is disclosed in U.S. Pat. No. 3,049,811.

SUMMARY OF THE INVENTION

The primary aim of the present invention is to provide a new and improved mouth-to-mouth resuscitation training manikin of the above character which is more natural and realistic than prior manikins of the same general type and yet which, at the same time, is of comparatively simple and low cost construction. In large, realism is imparted to the manikin through the provision of an extremely life-like head which is connected to the manikin for universal tilting and turning much in the same manner as a human head so that the trainee can gain a better idea as to how to position the head properly to apply mouth-to-mouth resuscitation. This aspect of the invention is particularly characterized by a novel ball-and-socket connection which mounts the head on the torso for tilting and turning, and by the capability of the head to tilt independently of the ball-and-socket connection so as to be able to more nearly undertake the same motions as a human head.

The invention also resides in the simplicity of the head mounting and in the ease with which the head may be attached to and detached from the torso; in the simple and relatively inexpensive construction of the lung and in the manner of mounting the lung in the torso; and in the unique one-piece construction of a simulated jaw which is adapted to be hinged to the head to pinch off the air passage when the head is incorrectly positioned.

Other objects and advantages of the invention will become apparent from the following detailed description when taken in connection with the accompanying drawings.

BRIEF DESCRIPTION OF THE DRAWINGS

FIG. 3 is an enlarged fragmentary cross-section taken substantially along the line 3—3 of FIG. 1.

FIG. 4 is a fragmentary cross-section taken substantially along the line 4—4 of FIG. 3.

FIG. 5 is a fragmentary cross-section taken substantially along the line 5—5 of FIG. 4.

FIG. 6 is an exploded perspective view of the inflatable lung and of a chest plate which overlies the lung.

FIG. 7 is an enlarged fragmentary cross-section taken substantially along the line 7—7 of FIG. 6.

FIG. 8 is a perspective view of an element for mounting the head of the manikin.

DETAILED DESCRIPTION OF THE PREFERRED EMBODIMENT

Figure 1:
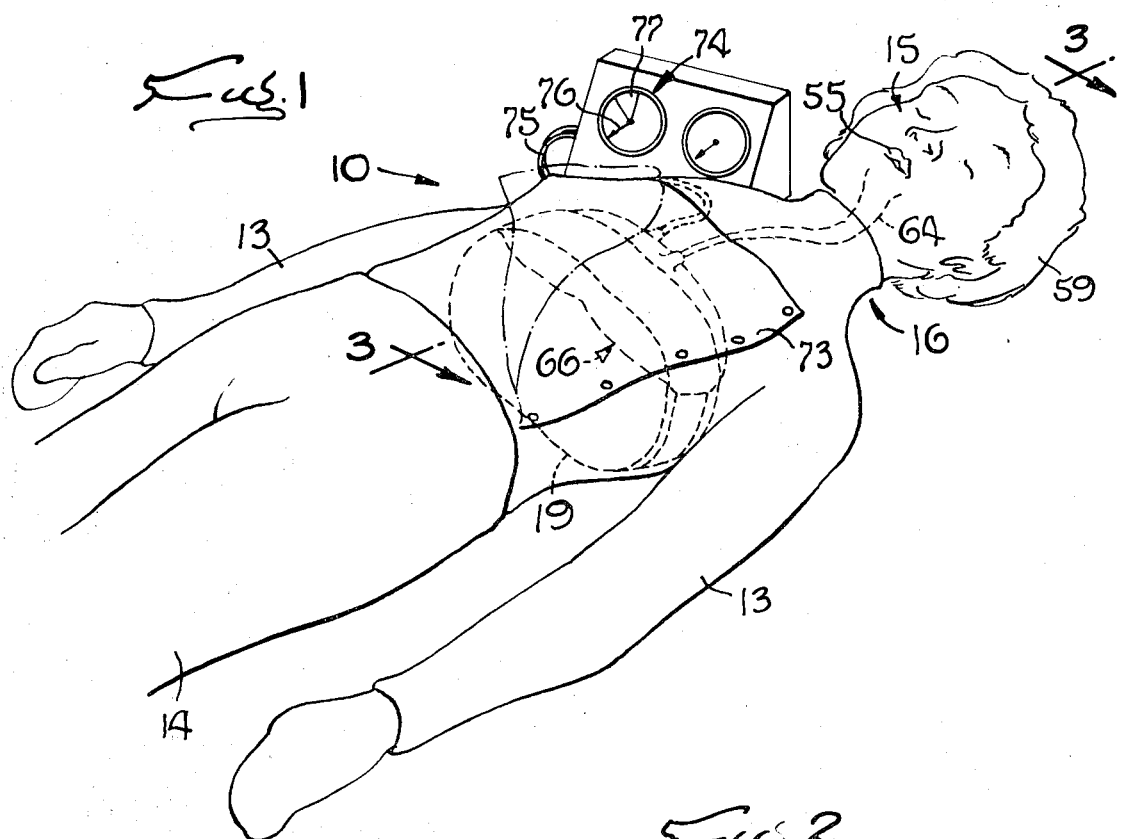
FIG. 1 is a fragmentary perspective view of a new and improved training manikin embodying the novel features of the present invention.

As shown in the drawings for purposes of illustration, the invention is embodied in a training manikin 10 which is particularly adapted for use in teaching and practicing the principles of mouth-to-mouth resuscitation (MMR). It is well known that MMR is an effective method of insufflating air into the lungs of an unconscious victim, such as a drowned person, to restore breathing and thus revive the victim. MMR is effected by the rescuer placing his mouth over the mouth of the victim and blowing into the airway or windpipe of the victim until the latter's chest rises and resistance to the expanding lungs is felt. The rescuer thereafter removes his mouth to allow the victim to exhale and, by repeated and rythmic inflation of the victim's lungs, spontaneous respiration often can be restored.

In an unconscious person, the jaw muscles relax and the tongue drops back to obstruct the throat and airway and to prevent the insufflation of air into the victim's lungs. This can be corrected by lifting the victim's neck with one hand and tilting the head back with the other hand so that the chin points almost straight upward. In this position of the head, the relaxed jaw muscles are tightened and the tongue is lifted out of the throat to enable air to pass from the rescuer's mouth to the victim's lungs. To aid in the teaching and practicing of MMR, various types of training manikins have been proposed and are used to enable trainee rescuers to learn the proper techniques of restoring respiration. Most such manikins make some type of provision for blocking the airway to the lungs when the head is in a certain position.

The present invention contemplates a new and extremely life-like MMR training manikin 10 which more realistically simulates an actual human victim, both in appearance and in possible head and neck motions, and which, in spite of its realism, is constructed in such a manner as to enable its marketing at a price that is generally competitive with prior and less satisfactory manikins. The present manikin is capable of providing the trainee with a more realistic notion as to correct fundamentals of MMR, and particularly in the proper positioning of the head, and enables the trainee to practice under conditions which are more nearly similar to those encountered when treating an actual human casualty.

Figure 2:
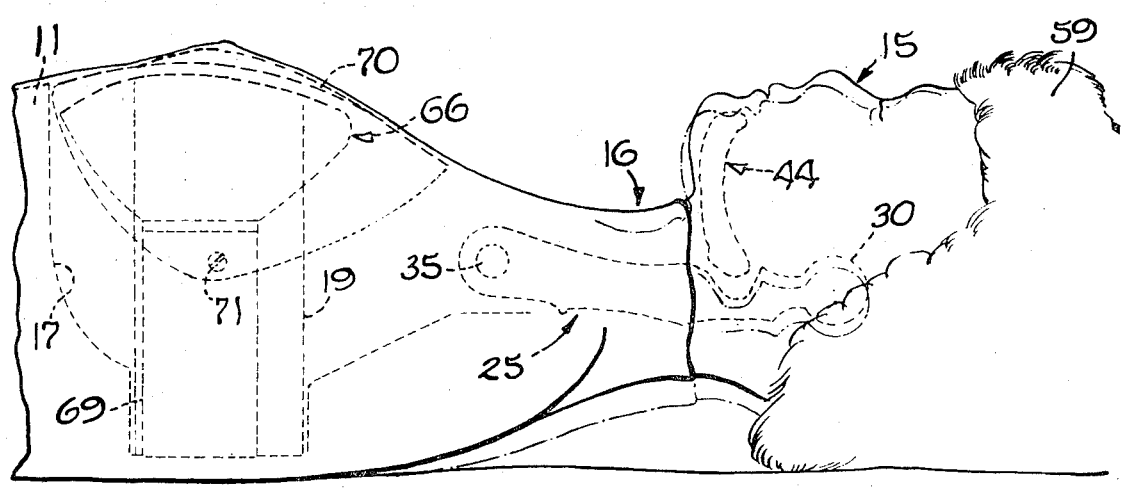
FIG. 2 is a fragmentary side elevation of the manikin shown in FIG. 1.

More specifically and as shown in FIGS. 1 to 3, the manikin 10 comprises a torso 11 which is molded of relatively rigid flesh-colored plastic and which is sized and shaped almost exactly the same as the torso of a young woman. Attached to the torso are permanently shaped arms 13 and legs 14 and also a life-like head 15 extending from a neck portion 16 of the torso. Formed within and opening out of the chest of the torso is a cavity 17 (FIG. 3) within which is removably fitted a simultated thorax unit 19 made of resiliently compressible material. The thorax unit is used in teaching and practicing the principles of external cardiac compression and, as disclosed more fully in our copending application Ser. No. 803,608, filed Mar. 3, 1969, is formed with a central opening 20 which receives a compressible bulb 21 simulating a human heart. As manual pressure is alternately applied to and released from the thorax unit, the bulb is contracted and expanded to pump blood-like liquid through transparent conduits 23 and a simulated circulatory system 24.

In carrying out one important aspect of the invention, the head 15 is mounted for front-to-rear and side-to-side tilting and, at the same time, is capable of substantially universal turning so as to be able to simulate essentially the same motions of a human head. For these purposes, the head is mounted on the torso 11 by a neck bone 25 (FIGS. 3 and 8) and is joined to the neck bone by a unique ball-and-socket connection 26 (FIG. 3) which enables the head to be tilted and turned to any of various positions that might be assumed by the head of an unconscious victim. Thus, the head is extremely realistic.

As shown most clearly in FIG. 3, the head 15 includes a shaped skull 27 which is molded of rigid plastic. In this instance, the ball-and-socket connection 26 for universally mounting the head comprises a generally spherical-shaped socket 29 formed in the base of the skull and pivotally receiving a ball 30 which is formed integrally with the upper end of the neck bone 25, the latter also being molded of rigid plastic. A clamp 31 is fastened to the base of the skull by a screw 33 and is formed with an arcuately curved clamping surface which is positioned to engage the ball and keep the latter seated in the socket. With this arrangement, the head may be tilted both front-to-rear and side-to-side about the ball between differently inclined positions and also may be turned back and forth about the ball to different angular positions like a human head. By loosening the screw to release the clamp, the ball and socket may be disconnected to permit removal of the head from the neck bone for purposes of repair or replacement.

The neck bone 25 extends through the neck portion 16 of the manikin 10 and, at its lower end, is advantageously connected to the torso 11 in such a manner as to allow front-to-rear tilting of the head 15 and the neck bone on the torso as a unit and independently of the ball-and-socket connection 26. Herein, the lower end portion of the neck bone is formed with a bifurcated yoke 34 (FIGS. 4 and 8) whose open end is spanned by a cylindrical pin 35 which is pivoted in an upwardly opening U-shaped seat 36 (FIG. 5) formed in a bracket 37. The latter is molded of plastic and is attached to the torso by as crew 39. With the pin 35 received pivotally in the seat 36, the neck bone and the head may be tilted from front-to-rear as a unit with respect to the torso 11 thereby to establish a further articulated connection between the head and the torso so as to enable lifting of the neck and positioning of the head in a manner similar to a human neck and head. The pin is retained within the seat by a pair of rectangular plates 40 (FIGS. 4 and 5) which overlie the pin and which are mounted on screws 41 extending through the bracket 37. By loosening wing nuts 43 on the lower ends of the screws, the plates may be turned on the screws in and out of overlying relation with the seat to enable removal of the pin 35 from the seat. The head and the neck bone thus may be removed from the torso as a unit and, if desired, may be passed among the trainees for teaching purposes.

Figure 2A:
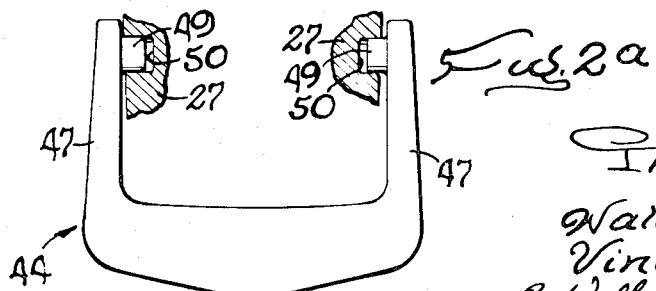
FIG. 2a is an elevation of the jaw hinged to the head, parts being broken away and shown in section.

Hinged to the skull 27 is a realistic simulated lower jaw 44 (FIGS. 2a and 3) which, together with the skull, defines a mouth in the front side of the head 15. For purposes of simplicity and cost, the jaw is advantageously molded from resilient plastic as a one-piece unit and is adapted to be hinged to the skull without the need of separate fasteners. As shown in FIG. 3, the jaw includes a forward chin portion 45 and a rear portion 46, the latter being located alongside the neck bone 25. Upstanding from the rear portion 46 along opposite sides of the skull are two spaced upright portions 47 (FIG. 2a) which may be manually grasped and flexed apart and which, upon being released, spring toward one another by virtue of the resiliency of the plastic. Molded integrally with the upright portions and projecting toward the skull are short horizontal pivot pins 49 adapted to be received in recesses 50 in opposite sides of the skull to hinge the jaw to the skull. To attach the jaw to the skull, the upright portions 47 are flexed apart, are positioned on opposite sides of the skull, and then are released to allow the pivot pins 49 to snap into the recesses 50. In the attached position, the jaw may swing upwardly and downwardly like a human jaw to close and open the mouth. The jaw may be removed from the skull simply by spreading the upright portions apart to pull the pins out of the recesses and then by slipping the jaw forwardly away from the skull. It thus will be apparent that the one-piece jaw with the integral pivot pins 49 is of relatively simple and low cost construction and can be quickly and easily attached to and detached from the skull.

To enhance the realism of the manikin 10, a skin-like face mask 51 (FIG. 3) molded of flexible flesh-colored vinyl is fitted over the skull 27 and is shaped to define a nose 53 with a nasal passage 54, a mouth 55, a chin 56, and a depending neck skin 57. The mask is split along a line running along the top and back of the skull and is adapted to be laced onto the skull by a shoestring (not shown). A separate wig 59 (FIGS. 1 and 3) is fitted over the face mask and may be removed from the mask for replacement or for cleaning, styling and combing. To add firmness to the flexible neck skin 57, an annular collar 60 (FIGS. 3 and 4) of relatively rigid plastic surrounds part of the neck bone 25 and is fitted into the neck skin to form a backing for the skin. Screws 61 fasten the collar to wings 63 formed integrally with the neck bone 25 and advantageously mount the collar for front-to-rear pivoting on the neck bone. Being pivoted, the collar does not interfere with front-to-rear tilting of the head 15 and will not bind against or be broken by the torso 16 when the head is tilted.

As shown most clearly in FIG. 3, the chin 56 of the face mask 51 is fitted around the jaw 44 and thus, when the jaw is swung downwardly, the mouth 55 is opened. Connected to the mouth and herein molded as an integral part of the face mask is a tubular air passage 64 which communicates with the nasal passage 54 and which extends horizontally from the mouth between the jaw 44 and the skull 27 and then curves downwardly between the neck bone 25 and the rear portion 46 of the jaw. The lower end of the air passage 64 is detachably connected to the upper end of a tube 65 whose lower end, in turn, is connected to an inflatable bag 66 (see FIGS. 6 and 7) which simulates a lung. The lung bag overlies the front of the thorax unit 19 and is formed from two face-to-face panels 67 (FIG. 7) of transparent polyethylene that are heat-sealed together along their margins. A band 69 (FIG. 6) is attached at its ends to opposite side edges of the lung bag by heat sealing and is wrapped around the thorax unit thereby to provide a relatively simple arrangement for holding the bag in place on the thorax unit.

With the foregoing arrangement, a trainee may practice mouth-to-mouth resuscitation by opening his mouth widely and sealing it tightly around the mouth 55 of the manikin 10. After pinching the nose 53 between his thumb and index finger to close off the nasal passage 54, the trainee may blow into the mouth 55 to force air through the air passage 64 and the tube 65 and into the lung bag 66 to inflate the latter. Alternatively, the trainee may practice mouth-to-nose resuscitation by sealing the mouth 55 closed and by blowing into the nasal passage 54 to inflate the lung bag. As the trainee rythmically blows air into the air passage and then removes his mouth from the manikin, the bag alternately becomes inflated and deflated and rises and falls between the positions shown in full and phantom in FIG. 7. To enable the trainee to see the results of MMR, a chest plate 70 (FIG. 6) which is sized and shaped in conformance with a human chest overlies the lung bag and is fastened to the sides of the thorax unit 19 by screws 71 (FIG. 2). The chest plate is made of transparent flexible plastic and, as the lung bag expands and collapses, the chest plate rises and falls to simulate the breathing motion of a human chest. As shown in FIG. 1, the manikin is dressed in a uniform with a swingable front flap 73 which may be opened and closed to expose or conceal the chest plate. When closed, the uniform flap rises and falls with the chest plate and thus the manikin appears similar to a fully dressed human undergoing MMR.

To help determine the proficiency of the trainee, a pressure gage 74 (FIG. 1) communicates with the lung bag 66 through a tube 75 and includes a needle 76 which is adapted to be deflected across a dial 77 through a distance which is proportional to the pressure of the air blown into the bag. The dial may be color-calibrated to indicate when the pressure is within a correct range to restore spontaneous breathing.

In order for the manikin 10 to simulate an unconscious human with an obstructed airway, the rear portion 46 of the jaw 44 is adapted to pinch off and restrict the air passage 64 unless the head 15 is tilted rearwardly about the ball-and-socket connection 26. As shown in FIG. 5 and by the dot-dash illustration in FIG. 2, the rear jaw portion 46 presses the air passage into a recess 79 in the neck bone 25 to clamp the air passage against the bone when the head is tilted forwardly. When the air passage is pinched off, it is difficult to blow sufficient air into the lung bag 66 to move the needle 76 of the gage 74 up to the correct pressure range. By first lifting upwardly on the back of the neck portion 16 and then by tilting the head 15 rearwardly as shown in full in FIG. 2, the jaw portion 46 may be pulled away from the neck bone 25 to unclamp the air passage 64 and to enable air to flow freely into the lung bag (see FIG. 3). The pivot pin 35 at the lower end of the neck bone enables lifting of the neck portion relative to the torso 11, and the ball-and-socket connection 26 enables the head to be tilted rearwardly with a motion similar to the tilting motion of a human head to unblock the air passage.

For sanitary considerations, the air blown into the lung bag 66 is prevented from exhausting reversely through the air passage 64 and blowing back into the face of the trainee. To prevent the reverse flow of air through the passage, an extremely simple check valve in the form of a flexible flap 80 (FIG. 7) is located at the inlet 81 of the lung bag. The flap is hinged to the bag adjacent the inlet by a heat seal and normally is disposed as shown in FIG. 7 to close off the inlet. Air flowing into the bag swings the flap upwardly (as viewed in FIG. 7) to open the inlet and, when the trainee stops blowing, the air in the bag forces the flap downwardly to its closed position to restrict the air from flowing reversely through the passage. As a result, there is less danger of cross-contamination between the trainees. To allow the lung bag to become deflated and to collapse between successive puffs of air, a small hole 83 (FIGS. 6 and 7) simply is formed in the bag at a point spaced from the inlet and allows the air to escape from the bag.

From the foregoing, it will be apparent that the MMR training manikin of the present invention is practically an exact life-like replica of a human and is very realistic in appearance and in head and neck motions. Many of the elements of the manikin, while performing their essential functions quite adequately, are uniquely designed with simplicity as a prime consideration so as to keep the cost of the manikin competitive with less realistic manikins which are presently available.

We claim as our invention:

1. In a training manikin for use in teaching and practicing the principles of mouth-to-mouth resuscitation, said manikin comprising a simulated human torso having a neck portion and having a chest portion with an nflatable bag simulating a lung, a simulated head having a mouth with an air passage connected between said mouth and said lung and extending through said neck portion whereby the bag may be inflated by breathing into said mouth, a neck bone extending through said neck portion between said torso and said head, a ball-and-socket connection between said head and the upper end of said neck bone and mounting the head universally on the neck bone for turning about the latter and for side-to-side and front-to-rear tilting relative to the neck bone, and means on said head for pinching said air passage against said neck bone when said head is tilted forwardly about said ball-and-socket connection thereby to restrict the flow of air through said passage from said mouth to said bag.

2. A training manikin as defined in claim 1 in which said ball-and-socket connection comprises a ball on the upper end of said neck bone fitted into a socket formed in said head, and means on said head for holding said ball in said socket and selectively releasable to permit detachment of said head from said neck bone.

3. A training manikin as defined in claim 1 in which said head comprises a molded skull, said means comprising a simulated lower jaw hinged to said skull and having a rear portion positioned to pinch said air passage against said neck bone when said head is tilted forwardly about said ball-and-socket connection, said rear portion of said jaw releasing said air passage from pinching engagement with said neck bone when said head is tilted rearwardly about said ball-and-socket connection.

4. A training manikin as defined in claim 3 in which said jaw is a one-piece molding with spaced upright portions extending upwardly from said rear portion and along opposite sides of said skull, pivot pins molded integrally with said upright portions and sized to fit into holes in opposite sides of said skull to hinge said jaw on said skull, and said upright portions being resiliently yieldable and adapted to be flexed apart to enable said pins to be inserted into and removed from said holes.

5. A training manikin as defined in claim 3 in which said head includes a face mask fitted over said head and under said jaw, said mouth being formed in said face mask with a portion of said air passage being connected to said mouth and extending between said skull and said jaw and into said neck portion between said neck bone and the rear portion of the jaw.

6. A training manikin as defined in claim 1 and further including a pivotal connection between said torso and the lower end of said neck bone and mounting the head and the neck bone for front-to-rear pivotal movement as a unit with respect to said torso.

7. A training manikin as defined in claim 6 in which said pivotal connection comprises a pin on the lower end of said neck bone, a bracket attached to said torso and pivotally receiving said pin, and means for holding said pin in said bracket and selectively releasable to permit detachment of said neck bone and said head from said torso.

8. A training manikin as defined in claim 6 in which said head includes a flexible face mask with a depending neck skin located around said neck portion, said neck portion including an annular collar separate from said torso and fitted within said neck skin to form a firm backing for the neck skin, and means connecting said collar to said neck bone for front-to-rear pivoting of the collar thereby to facilitate front-to-rear tilting and pivoting of said head.

9. A training manikin as defined in claim 1 in which said inflatable bag is made of plastic and includes an inlet connected to said air passage, a check valve in said inlet to restrict the reverse flow of air through said passage from said bag to said mouth, said check valve including a flexible plastic flap hinged to said bag and normally positioned to close said inlet, said flap being movable to an open position by air flowing into said inlet and thereafter automatically moving to said closed position to restrict the escape of air from the inlet.

10. A training manikin as defined in claim 9 further including a small hole formed in said bag at a location spaced from said inlet to allow air to escape gradually from said bag.

11. A training manikin as defined in claim 1 further including a simulated thorax unit fitted removably into the chest portion of said torso and having the same general cross-section as a human thorax, said bag overlying the front of said thorax unit and including a flexible band extending around the thorax unit to hold the bag on the thorax unit, and a flexible chest plate overlying said bag, said chest plate being sized and shaped to conform generally to a human chest and being connected to said thorax unit to rise and fall as air is admitted into and exhausted from said bag.

12. In a training manikin for use in teaching and practicing the principles of mouth-to-mouth resuscitation, said manikin comprising a simulated human torso having a neck portion and having a chest portion with an inflatable bag simulating a lung, a simulated head having a skull and a mouth, an air passage connected between said mouth and said lung and extending through said neck portion whereby the bag may be inflated by breathing into said mouth, a neck bone extending through said neck portion between said torso and said head, a ball-and-socket connection between said skull and the upper end of said neck bone and mounting the head universally on the neck bone for turning about the latter and for side-to-side and front-to-rear tilting relative to the neck bone, a jaw hinged to said skull and positioned to pinch said air passage against said neck bone when said head is tilted forwardly about said ball-and-socket connection thereby to restrict the flow of air through said passage from said mouth to said bag, and a pivotal connection between said torso and the lower end of said neck bone and mounting the head and neck bone for front-to-rear pivotal movement as a unit with respect to said torso whereby said neck portion may be lifted to permit rearward tilting of said head.

References Cited

UNITED STATES PATENTS

| 3,049,811 | 8/1962 | Ruben | 35—17 |
| 3,276,147 | 10/1966 | Padellford | 35—17 |

FOREIGN PATENTS

| 934,755 | 8/1963 | Great Britain | 35—17 |

HARLAND S. SKOGQUIST, Primary Examiner